United States Patent
Kaaden

(10) Patent No.: US 7,130,254 B2
(45) Date of Patent: Oct. 31, 2006

(54) REPRODUCTION OR RECORDING APPARATUS FOR DIFFERENT OPTICAL RECORDING MEDIA

(75) Inventor: Jürgen Kaaden, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 218 days.

(21) Appl. No.: 10/498,443

(22) PCT Filed: Nov. 27, 2002

(86) PCT No.: PCT/EP02/13341
§ 371 (c)(1),
(2), (4) Date: Jun. 10, 2004

(87) PCT Pub. No.: WO03/050808
PCT Pub. Date: Jun. 19, 2003

(65) Prior Publication Data
US 2005/0007810 A1    Jan. 13, 2005

(30) Foreign Application Priority Data
Dec. 10, 2001  (DE) ............................... 101 60 378

(51) Int. Cl.
*G11B 5/09*     (2006.01)
*G11B 7/00*     (2006.01)

(52) U.S. Cl. .................... 369/47.5; 369/116; 369/120; 369/124.04

(58) Field of Classification Search .................... None
See application file for complete search history.

(56) References Cited

U.S. PATENT DOCUMENTS

2004/0105364 A1*  6/2004  Chow et al. ............. 369/47.19
2005/0122880 A1*  6/2005  Tatsuno et al. ............... 369/99
2006/0007837 A1*  1/2006  Arai et al. ............. 369/112.01

FOREIGN PATENT DOCUMENTS

| EP | 426035 | 5/1991 |
|---|---|---|
| EP | 1067529 | 1/2001 |
| JP | 3-17840 | 1/1991 |
| JP | 2001/266388 | 9/2001 |

OTHER PUBLICATIONS

Patent Abstracts of Japan, vol. 2000, No. 26, Jul. 1, 2002 & JP 2001/266388 (See Ref. AC).
Patent Abstracts of Japan, vol. 15, No. 140, Apr. 9, 1991 & JP 3-17840 (See Ref. AD).
Copy of Search Report Dated Mar. 14, 2003.

* cited by examiner

*Primary Examiner*—Muhammad Edun
(74) *Attorney, Agent, or Firm*—Joseph J. Laks; Robert D. Shedd; Reitseng Lin

(57) ABSTRACT

The invention relates to a reproduction or recording apparatus for different optical recording media, which differ for example with regard to their storage density, are scanned by different means and have a photodetector arrangement that is jointly used for the different recording media and scanning means, which arrangement provides a photodetector signal which is independent of the absolute light power level of the laser diodes. For generating the photodetector signal which is independent of the absolute light power level of the laser diodes, a switch for changing over the sensitivity of the photodetector is provided, which switch is controlled by the modulator for generating a uniform light power with a laser diode. A connecting line to the basic apparatus and corresponding terminals for controlling the switch are advantageously obviated as a result. The application of the invention is envisaged for reproduction or recording apparatuses of different optical recording media in which a modulation of the laser current is provided for generating a uniform light power.

7 Claims, 2 Drawing Sheets

REPRODUCTION OR RECORDING APPARATUS FOR DIFFERENT OPTICAL RECORDING MEDIA

Figure 1:
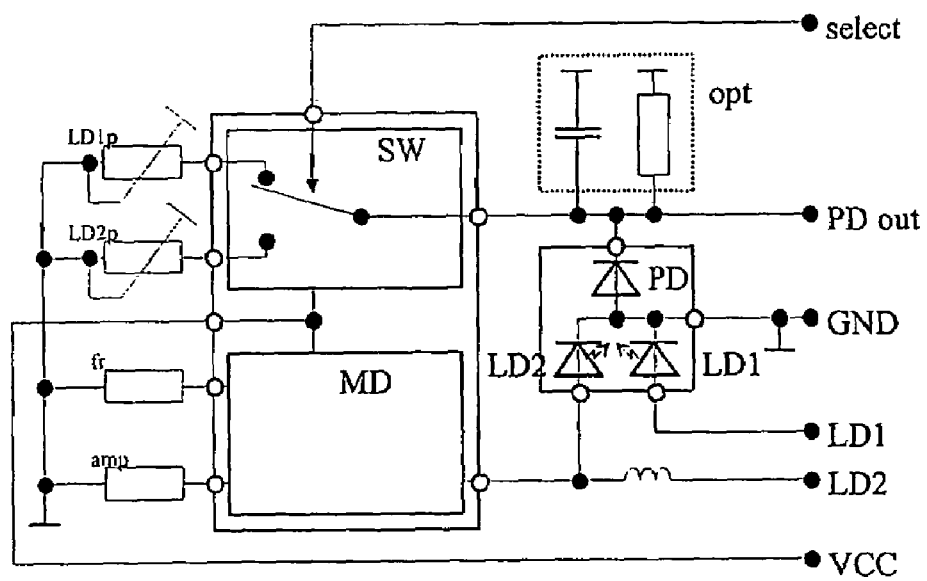

This application claims the benefit, under 35 U.S.C. §365 of International Application PCT/EP02/13341, filed Nov. 27, 2002, which was published in accordance with PCT Article 21(2) on Jun. 19, 2003 in English and which claims the benefit of German patent application No. 10160378.9, filed Dec. 10, 2001.

The invention relates to a reproduction or recording apparatus for different optical recording media, which differ for example with regard to their storage density, are scanned by different means and have a photodetector arrangement that is jointly used for the different recording media and scanning means, which arrangement provides a photodetector signal which is independent of the absolute light power level of the laser diodes.

Optical recording media such as the DVD and the CD, for example, which differ with regard to their storage density and structure, such as layer construction and size of the information storage elements, are generally known. Recording and reproducing information on such different recording media requires both a light source adapted to the respective recording medium and a detector which is to be set with regard to its sensitivity for regulating the light power of the light source or for adaptation to the light that is reflected differently from the recording media. A twin laser is already known, which provides the light required for recording or reproduction for different recording media. Such twin lasers are generally equipped with a photodiode, which is also referred to as a monitor diode, or a photodetector, which are provided as an integrated part of the twin laser for detecting different light powers. The signal of a photodetector is then to be used to control at least two different light sources or two different light power levels, so that it is necessary to adapt the downstream processing circuit or to alter the sensitivity of the photodetector. Consequently, a switching means and a switching signal are to be provided with which the sensitivity of the photodetector or of a downstream processing circuit is adapted to the respective light power level. However, this disadvantageously requires additional lines and connecting elements via which a switching element that is to be provided on the optical scanning device is to be driven. Since the optical scanning device is generally provided in movable fashion for following the recording or reproduction track of the recording medium, the intention is, moreover, for the number of connections of the scanning device to the basic apparatus to be as small as possible.

Therefore, it is an object of the invention to provide a reproduction or recording apparatus for different optical recording media having a jointly used photodetector arrangement in which a control line for setting the sensitivity of a photodetector or a processing circuit connected to the photodetector is not necessary.

This object is achieved by means of features specified in the independent claim. Advantageous refinements are specified in dependent claims.

In accordance with one aspect of the invention, a reproduction or recording apparatus for different optical recording media having a jointly used photodetector arrangement is proposed which requires a low outlay for controlling the sensitivity of a photodetector or a processing circuit connected to the photodetector for adaptation to different light power levels which are used to scan different optical recording media. Since, on the one hand, with only one photodetector, the light power of two laser diodes is intended to be controlled with only one amplifier and, on the other hand, a changeover of the sensitivity of the photodetector on account of the small amplitude of the output signal is to be provided as near as possible to the photodetector, the switching means for changing over the sensitivity of the photodetector is to be provided in direct proximity to the photodetector or on the scanning device, also referred to as Pickup. By changing over the sensitivity of the photodetector, a photodetector signal which is independent of the absolute light power level of the laser diodes and can be used for controlling different light power levels is then advantageously provided. For controlling the switching means, the switching means is connected to a modulator which is connected to a laser diode for generating a modulation signal which is used to generate a comparatively more uniform laser light in a known manner. The modulator has a control assembly which controls an oscillator with amplifier connected downstream for generating the modulation signal. A switching signal generated by the control assembly is then used for controlling the switching means for changing over the sensitivity of the photodetector. The terminals and line connections to the basic apparatus which are provided in known arrangements for controlling the switching means are obviated by using the means for generating a light power level that differs from a first light power level for controlling the sensitivity of the photodetector or a processing circuit connected to the photodetector, which is likewise arranged on the scanning device.

In accordance with one embodiment, a photodetector signal which is independent of the absolute power level of the laser diodes is provided by means of a photodiode integrated in a twin laser and a small number of signal lines. The light power of the two laser diodes of the twin laser is controlled by a photodiode which, for controlling the sensitivity of the photodetector, is connected to a resistor via a switching means or a switch. The switch is controlled by a modulator which is connected to a laser diode for the recording or reproduction of one of the different recording media. In accordance with one embodiment, the switch is arranged together with the modulator on a substrate as an electronic switch and may have a switch-on/off behavior independent of the modulator by the switch being switched on or off for example in inverse or delayed fashion with respect to the modulator.

Modulation of the laser diode current fed to a laser diode results in more uniform light power generation, which is necessary in particular for the recording or reproduction of optical recording media having a relatively high storage density, such as a DVD, for example. The modulation is high-frequency modulation in the region of 500 MHz, for example. For this purpose, the laser diode, which is supplied with a basic current by the basic apparatus, is connected to the modulator which is switched on via this connection and modulates the laser diode current. For this purpose, a control device is provided in the modulator, which control device drives an oscillator for generating a high-frequency signal and the output signal of the control device is advantageously used for controlling the switch which controls the sensitivity of the photodetector. By virtue of the fact that an output signal of the control device of the modulator is used for controlling the switch which controls the sensitivity of the photodetector, a control line for adapting the sensitivity of a photodetector or a processing circuit connected to the photodetector is not necessary. In order to avoid an undesirable transition of the photodetector signal during the changeover of the sensitivity of the photodetector, a resistor and a capacitor are connected to the output of the photodetector. In accordance with one embodiment, the said resistor is provided for setting a laser diode basic light power or the highest sensitivity of the photodetector and simultaneously prevents undesirable photodetector signals when changing over the sensitivity.

The invention is explained in more detail below with reference to exemplary embodiments in drawings.

Figure 2:
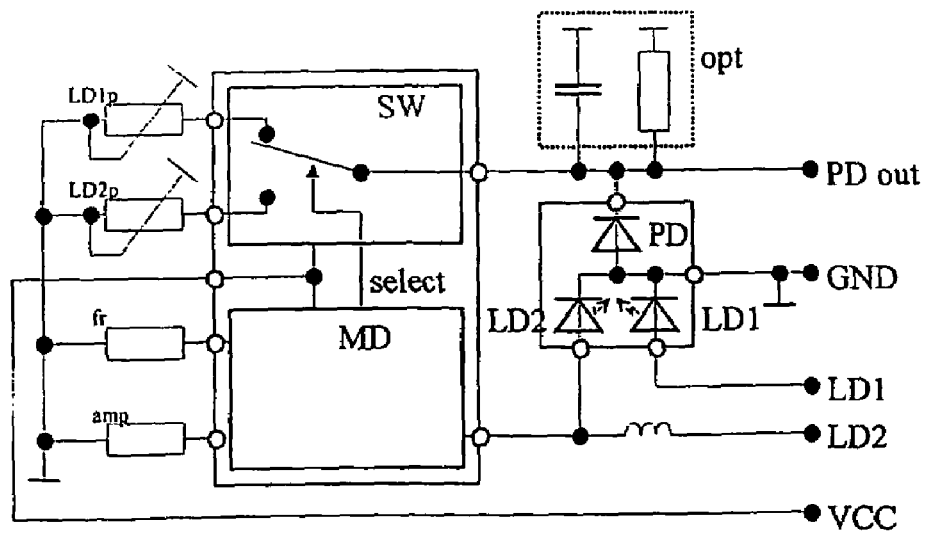
Figure 3:
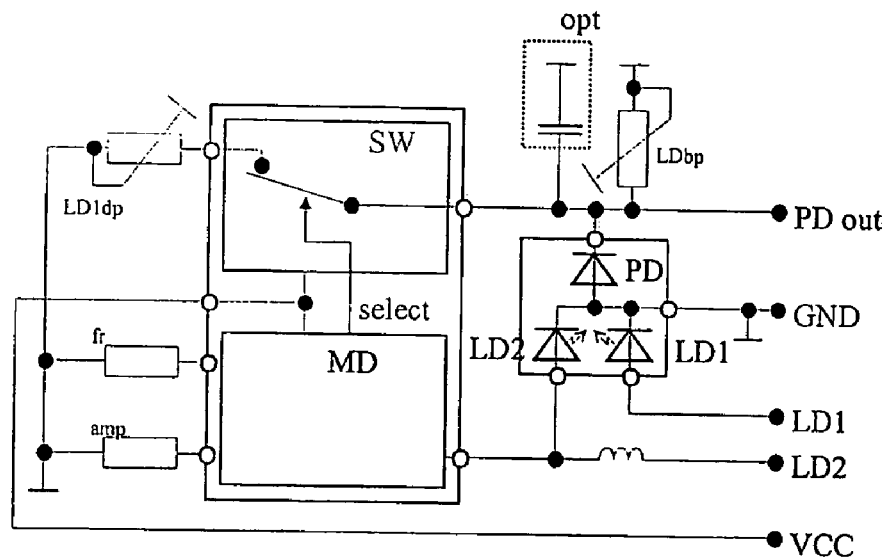
Figure 4:
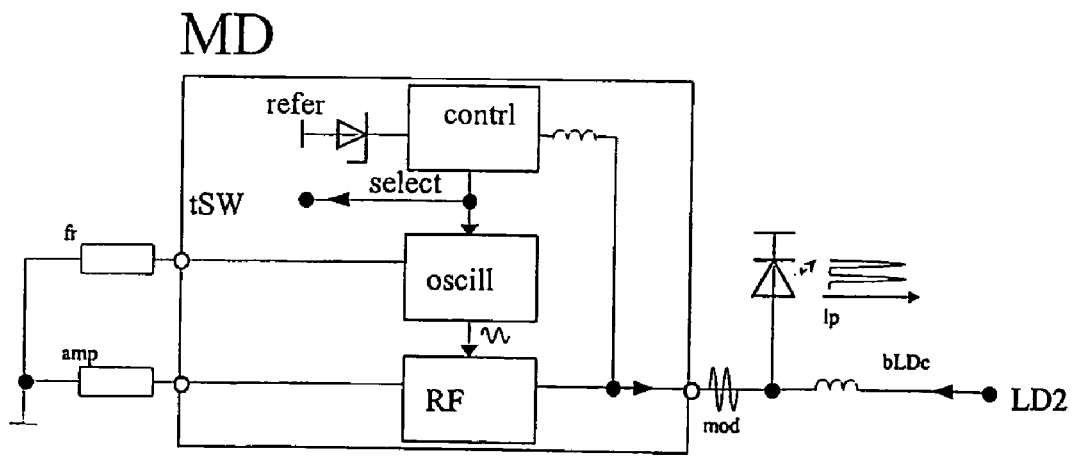

In the figures:

FIG. 1 shows a block diagram of a known circuit arrangement for providing a photodetector signal which is independent of the absolute light power level of a plurality of laser diodes, FIG. 2 shows a block diagram of a circuit arrangement for providing a photodetector signal which is independent of the absolute light power level of a plurality of laser diodes, without an additional control line, FIG. 3 shows a block diagram of a circuit arrangement for providing a photodetector signal which is independent of the absolute light power level of a plurality of laser diodes, without an additional control line, in a second embodiment, and FIG. 4 shows a block diagram of a laser diode modulator.

FIG. 1 illustrates the block diagram of a known circuit arrangement for providing a photodetector signal PDout which is independent of the absolute light power level of a plurality of laser diodes LD1, LD2. Such a circuit arrangement is provided in reproduction or recording apparatuses for different optical recording media, which differ for example with regard to their storage density, are scanned by different means and have a photodetector arrangement that is jointly used for the different recording media and scanning means, which arrangement provides a photodetector signal PDout which is independent of the absolute light power level of the laser diodes LD1, LD2. As illustrated in FIG. 1, in the case of a twin laser, two laser diodes LD1, LD2 are embodied in a manner integrated together with a photodiode PD in an assembly in which the laser diodes LD1, LD2 and the photodiode PD are connected to one another via a common ground line GND. Such twin lasers are used for the recording or reproduction of information on different optical recording media, such as a DVD and a CD, for example. A light source which generates a light power that is as uniform as possible is required in particular for recording or reproduction with optical recording media having a high storage density. Uniform light power is understood to mean a light power with narrow spectral lines in the wavelength range and little noise. For this purpose, the current which is fed to a laser diode LD2 is modulated with a high-frequency signal provided by a modulator MD. Furthermore, a switch SW is provided which controls the sensitivity of the photodetector for providing a photodetector signal PDout which is independent of the absolute light power level of the laser diodes LD1, LD2. The provision of a photodetector signal PDout which is independent of the absolute light power level of the laser diodes LD1, LD2 is provided in order to be able to regulate the light power of both laser diodes LD1, LD2 with only one amplifier. For setting different currents for the laser diodes LD1, LD2, the amplifier (not illustrated) has different driver stages to which the laser diodes LD1, LD2 are connected. One or other of the laser diodes LD1, LD2 is then driven in accordance with the respective requirements of the recording medium. The light power levels generated by the laser diodes LD1, LD2 are different, so that a signal generated by the photodiode PD also has corresponding differences. In order nevertheless to generate a photodetector signal PDout which is independent of the absolute light power level of the laser diodes LD1, LD2, the photodiode PD is connected to resistors LD1p, LD2p via a switch SW. The resistors LD1p, LD2p form, with the photodiode PD, a photodetector whose sensitivity is controlled by the switch SW provided as a changeover switch. The resistors LD1p, LD2p are provided in adjustable fashion for adapting the sensitivity of the photodetector to the respective light power level. In accordance with this embodiment, the different sensitivity of the photodetector is achieved by different resistances being connected in parallel with the photodiode PD. The output signal of the photodiode PD is thereby attenuated differently for generating a photodetector signal PDout which is independent of the absolute light power level of the laser diodes LD1, LD2. Since the resistors LD1p, LD2p are momentarily not connected to the photodiode PD during the changeover period of the switch SW, an assembly opt is connected to the photodiode PD, which assembly comprises the parallel circuit formed by a resistor and a capacitor, in order to avoid undesirable photodetector signals PDout during the changeover.

In this case, the resistor in this parallel circuit is dimensioned such that its resistance is significantly greater than the values of the resistors LD1p and LD2p. Furthermore, a resistor fr and a resistor amp are connected to the modulator MD, which resistors are used to set frequency and amplitude of a modulation signal mod generated by the modulator MD. In addition to the terminals for the power supply of the laser diodes LD1, LD2 and the terminal at which the photodetector signal PDout is provided, there are provided on the Pickup terminals for a supply voltage VCC and a ground line GND and also a terminal select for controlling the switch SW and, from each of these terminals, a line leads from the Pickup to the basic apparatus. The supply voltage VCC supplies the modulator MD and the switch SW—embodied electronically—and at the same time ensures that even when the modulator MD is not activated, the electronic switch SW has a low internal resistance of about 30 ohms to 100 ohms, depending on the temperature. The term basic apparatus is used here to denote the Mechadeck on which the scanning device is arranged in movable fashion for following the recording or reproduction track of the recording medium. In order to minimize the number of terminals and the number of connecting lines from the scanning device to the basic apparatus, provision is made, in accordance with FIG. 2, for controlling the switch SW by means of the modulator MD, so that corresponding terminals select and also a connecting line to the basic apparatus are advantageously not necessary and a photodetector signal PDout which is independent of the absolute light power level of the laser diodes LD1, LD2 is nevertheless generated. The reference symbols are chosen to correspond in the figures. Even though the embodiment illustrated in FIG. 2 does not have a separate terminal select for a connection to the basic apparatus and the corresponding connecting line is obviated, the proposed solution is identical to the embodiment illustrated in FIG. 1 with regard to its function. The control of the switch SW by the modulator MD is made possible by the use of a control assembly contrl—illustrated in FIG. 4—of the modulator MD for controlling the switch SW. The modulator MD illustrated in FIG. 4 is connected via a line to the laser diode LD2 at the terminal via which the basic laser current bLDc is fed to the laser diode LD2. Via this line, the modulator MD is switched on for generating a modulation signal mod and the modulation signal mod is also fed to the laser diode LD2, so that the laser diode LD2 generates a light power Ip which is modulated with a high-frequency signal and is distinguished by greater uniformity in comparison with the unmodulated light power, in a known manner. By virtue of the fact that a control assembly contrl is provided in the modulator MD, which control assembly switches on an oscillator oscill with amplifier RF connected downstream when a basic laser current bLDc is fed to the laser diode LD2, the control assembly contrl is advantageously likewise used for controlling the switching means designated as switch SW by the terminal select being connected to said control assembly contrl. In the control assembly contrl of the modulator MD, through comparison with a reference voltage refer when a basic laser current bLDc is fed to the laser diode LD2, a switching signal is generated and the switch SW is then controlled by the switching signal of the control assembly contrl of the modulator MD via a control line tSW, so that there is no need for a connecting line to the basic apparatus for controlling the switch SW. As already illustrated in FIGS. 1 to 3, the modulator MD can be arranged with the switch SW on a common substrate, thereby producing an assembly in which the modulator MD and the switch SW are integrated. A resistor fr for setting the frequency of the oscillator oscill is connected to the oscillator oscill of the modulator MD and a resistor amp for setting the amplitude of the modulation signal mod is connected to the amplifier RF of the modulator MD. A further exemplary embodiment of the invention is specified in FIG. 3. In contrast to the embodiment illustrated in FIG. 2, here a simple switch SW is provided as switch SW instead of a changeover switch and a resistor provided in the assembly opt and also the resistor LD2p are replaced, in accordance with FIG. 3, by a resistor LDbp which is connected to the photodiode PD and is advantageously provided both for preventing undesirable photodetector signals PDout during the changeover of the sensitivity of the photodetector and for setting a laser diode basic light power or the highest sensitivity of the photodetector. In accordance with this embodiment, the sensitivity of the photodetector is reduced by the resistor LD1p being connected in parallel with the photodiode PD by means of the switch SW, in order to generate a photodetector signal PDout which is independent of the absolute power level is of a plurality of laser diodes LD1, LD2. The photodiode PD may be a photodiode PD which is provided as a so-called monitor diode in connection with the laser diodes LD1, LD2 or a photodetector element comprising a plurality of segments. The terms sensitivity of a photodetector and sensitivity of a processing circuit connected to the photodetector are to be understood to be synonymous, since altering the sensitivity of a detector can be equated, in principle, with altering the input sensitivity of a processing circuit connected to the detector.

The embodiments described here are specified as examples and a person skilled in the art can realize other embodiments of the invention which remain within the scope of the invention.

What is claimed is:

1. A reproduction or recording apparatus for difference optical recording media, in which a photodetector arrangement is used for different light power levels of a plurality of laser diodes, which arrangement provides a photodetector signal which is independent of the absolute light power level of the laser diodes, wherein, for changing over the sensitivity of a photodetector for different light power levels for providing a photodetector signal which is independent of the absolute light power level, a switch is provided which is connected to a modulator to receive a switching signal from the modulator, which modulator is connected to a laser diode for generating a modulation signal for a modulated light power.

2. The reproduction or recording apparatus as claimed in claim 1, wherein the modulator has a control assembly to which is connected a control line for controlling the switch.

3. The reproduction or recording apparatus as claimed in claim 1, wherein the modulator and the switch for changing over the sensitivity of a photodetector for different light power levels are arranged on a substrate.

4. The reproduction or recording apparatus as claimed in claim 1, wherein the photodetector for providing a photodetector signal which is independent of the absolute light power level is a photodiode with which at least one resistor can be connected in parallel by means of the switch.

5. The reproduction or recording apparatus as claimed in claim 1, wherein the photodetector for providing a photodetector signal which is independent of the absolute light power level is a photodiode to which a resistor is connected which is provided both for preventing undesirable photodetector signals during the changeover of the sensitivity of the photodetector and for setting the highest sensitivity of the photodetector.

6. The reproduction or recording apparatus as claimed in claim 1, wherein the switch is an electronic switching means.

7. The reproduction or recording apparatus as claimed in claim 1, wherein the switch has a switch-on/-off behavior which is independent of the modulator.

* * * * *